(12) United States Patent
Hwang et al.

(10) Patent No.: US 8,314,917 B2
(45) Date of Patent: Nov. 20, 2012

(54) LIQUID CRYSTAL DISPLAY DEVICE HAVING GATE IN PANEL DRIVER AND SPACER CONFIGURATION

(75) Inventors: Seung-Yeon Hwang, Gyeongsangbuk-Do (KR); Jin Her, Daejeon (KR)

(73) Assignee: LG Display Co., Ltd., Seoul (KR)

( * ) Notice: Subject to any disclaimer, the term of this patent is extended or adjusted under 35 U.S.C. 154(b) by 400 days.

(21) Appl. No.: 12/491,611

(22) Filed: Jun. 25, 2009

(65) Prior Publication Data
US 2010/0128207 A1    May 27, 2010

(30) Foreign Application Priority Data
Nov. 25, 2008 (KR) .................. 10-2008-0117735

(51) Int. Cl.
*G02F 1/1339* (2006.01)
*G02F 1/1343* (2006.01)
*G02F 1/1335* (2006.01)
(52) U.S. Cl. ......... 349/155; 349/106; 349/149; 349/151
(58) Field of Classification Search .................. 349/106, 349/149, 151, 155, 157
See application file for complete search history.

(56) References Cited

U.S. PATENT DOCUMENTS
| | | | |
|---|---|---|---|
| 2001/0025958 A1* | 10/2001 | Yamazaki et al. | 257/72 |
| 2002/0089636 A1* | 7/2002 | Kang et al. | 349/156 |
| 2003/0071959 A1* | 4/2003 | Koyama | 349/156 |
| 2003/0137631 A1* | 7/2003 | Nakayoshi et al. | 349/155 |
| 2007/0120152 A1* | 5/2007 | Chang et al. | 257/270 |
| 2007/0132936 A1* | 6/2007 | Lee et al. | 349/156 |
| 2008/0158496 A1 | 7/2008 | Kim et al. | |

FOREIGN PATENT DOCUMENTS
| | | |
|---|---|---|
| KR | 10-2006-0078754 | 7/2006 |
| KR | 10-2008-0063016 | 7/2008 |

OTHER PUBLICATIONS

Korean Office Action dated Aug. 23, 2011 from corresponding KR Patent Application 10-2008-0117735.

* cited by examiner

*Primary Examiner* — Michael Caley
(74) *Attorney, Agent, or Firm* — Morgan, Lewis & Bockius LLP

(57) ABSTRACT

In a gate in panel (GIP) type liquid crystal display (LCD) device in which a gate driver is directly mounted within a thin film transistor array substrate, a column spacer structure of a GIP circuit part has the same diamond structure as a gap spacer structure of an active region, and a dummy color filter pattern is formed at the GIP circuit part to have the same step as the active region where the cap spacers are positioned to thus prevent a cell gap deficiency between the GIP circuit part and the active region. The LCD device includes: an array substrate divided into an active region on which an image displayed and a GIP circuit part on which a gate driver is mounted; a color filter substrate attached to the array substrate in a facing manner; a color filter formed on an inner surface of the color filter substrate of the active region and including red, green and blue sub-color filters; a dummy color filter pattern formed at an inner surface of the color filter substrate of the GIP circuit part to correspond to the red sub-color filters; and a gap spacer formed at the active region to maintain a cell gap between the color filter substrate and the array substrate and a GIP column spacer formed on the dummy color filter pattern of the GIP circuit part.

6 Claims, 2 Drawing Sheets

LIQUID CRYSTAL DISPLAY DEVICE HAVING GATE IN PANEL DRIVER AND SPACER CONFIGURATION

BACKGROUND OF THE INVENTION

1. Field of the Invention

The present invention relate to a liquid crystal display device and more particularly, to a gate in panel (GIP) type liquid crystal display device in which a gate driver is directly mounted on a thin film transistor array substrate.

2. Description of the Related Art

In general, a liquid crystal display (LCD) device is a display device fo0r displaying a desired image by separately supplying data signals according to image information to pixels arranged in a matrix form and adjusting a light transmittance of the pixels.

To this end, the LCD device includes a liquid crystal panel including pixels arranged in a matrix form and a driver for driving the pixels.

The liquid crystal panel includes an array substrate on which a thin film transistor array is formed and a color filter substrate on which color filters are formed. The array substrate and the color filter substrate are attached with a uniform cell gap therebetween, and a liquid crystal layer is formed at the cell gap between the array substrate and the color filter substrate.

Alignment films are formed on the facing surfaces of the array substrate and the color filter substrate, and rubbed to make liquid crystal of the liquid crystal layer arranged in a regular direction.

In addition, the array substrate and the color filter substrate are attached by a seal pattern formed along outer edges of a pixel part, and a polarizer, a phase difference plate, and the like are provided on outer surfaces of the array substrate and the color filter substrate. The plurality of elements is selectively configured to change a proceeding state of light or a refractive index to thus obtain the liquid crystal panel having high luminance and contrast characteristics.

The LCD device configured as described above will now be described in detail.

FIG. 1 is a schematic block diagram of a general LCD device.

As shown in FIG. 1, the general LCD device includes a liquid crystal panel 10 and a driving circuit unit 20 supplying various signals required for implementing an image.

The liquid crystal panel 10 includes a liquid crystal and first and second substrates attached in parallel with the liquid crystal interposed therebetween, and an array element for driving liquid crystal is provided on an inner surface of the first substrate called an array substrate. That is, a plurality of gate lines 16 and a plurality of data lines 17 are arranged in a crossing manner to define pixels in a matrix form on the array substrate, and a thin film transistor (TFT) is provided at each crossing and connected to pixel electrodes formed at each pixel in a one-to-one manner.

Color filter elements such as common electrodes facing the pixel electrodes with the liquid crystal layer interposed therebetween as well as color filters for color implementation are provided on an inner surface of the second substrate called a color filter substrate, and accordingly, the pixel electrodes, the common electrodes as well as the liquid crystal layer form a liquid crystal capacitor.

The driving circuit unit 20 includes a timing controller 25, a gate driver 21, a data driver 22, and other elements such as an interface, a reference voltage generating unit, a power voltage generating unit, and the like.

The interface relays an external driving system such as a personal computer or the like and the timing controller 25, and the timing controller 25 generates a frame control signal supplied to the gate driver and image data and an image control signal transferred to the data driver 22 by using an image and a control signal transferred from the interface.

The gate driver 21 and the data driver 22 are attached to two adjacent edge portions by the medium of a tape carrier package (TCP) and the like such that the gate lines 16 and the data lines 17 can be connected thereto. The gate driver 21 generates a gate signal to sequentially enable the gate lines 16 by frames in response to a frame control signal of the timing controller 25 to control ON/OFF of the TFTs of each gate line 16. The data driver 22 selects reference voltages corresponding to image data in response to the image data and the image control signal inputted from the timing controller 25, and supplies the same to the data lines.17.

When TFTs selected by the gates lines 16 according to the gate signal of the gate driver 21 are turned on, data signals of the data driver 22 are transferred to the pixels via the corresponding TFTs, and accordingly, liquid crystal is driven by an electric field between the pixel electrodes and the common electrodes. In this process, the reference voltage generating unit generates a digital-to-analog converter (DAC) reference voltage of the data driver 22, and the power voltage generating unit supplies operation power with respect to each element of the driving circuit unit 25 and a common voltage transferred to the common electrodes of the liquid crystal panel 10.

The TFTs for the general LCD device may be divided into amorphous silicon TFT and polycrystalline silicon TFT according to types of materials of a semiconductor layer serving as a conductive channel. In case of using dual-amorphous silicon, the gate driver 21 and the data driver 22 are separately fabricated from the liquid crystal panel 10 and connected to the gate lines 16 and the data lines 17 via a tape automated bonding (TAB) method as shown in FIG. 1.

Thus, in the LCD having the amorphous silicon TFT, because the gate driver and the data driver are separately fabricated and attached to the liquid crystal panel through the TAB method, costs and processes are increased.

SUMMARY OF THE INVENTION

An object of the embodiments of the invention is to provide a gate in panel (GIP) liquid crystal display (LCD) device in which a gate driver is directly mounted on a thin film transistor (TFT).

Another object of the embodiments of the invention is to provide an LCD device capable of preventing a cell gap deficiency between a GIP circuit part and an active region when a GIP structure is employed.

Additional features and advantages of embodiments of the invention will be set forth in the description which follows, and in part will be apparent from the description, or may be learned by practice of embodiments of the invention. The objectives and other advantages of the embodiments of the invention will be realized and attained by the structure particularly pointed out in the written description and claims thereof as well as the appended drawings.

To achieve these and other advantages and in accordance with the purpose of embodiments of the invention, as embodied and broadly described, an LCD including: an array substrate divided into an active region on which an image displayed and a GIP circuit part on which a gate driver is mounted; a color filter substrate attached to the array substrate in a facing manner; a color filter formed on an inner surface of the color filter substrate of the active region and including red, green and blue sub-color filters; a dummy color filter pattern formed at an inner surface of the color filter substrate of the GIP circuit part to correspond to the red sub-color filters; and gap spacers formed at the active region to maintain a cell gap between the color filter substrate and the array substrate and GIP column spacers formed on the dummy color filter pattern of the GIP circuit part.

It is to be understood that both the foregoing general description and the following detailed description are exemplary and explanatory and are intended to provide further explanation of embodiments as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF PREFERRED EMBODIMENTS

A liquid crystal display (LCD) according embodiments of the present invention will now be described with reference to the accompanying drawings.

Figure 1:
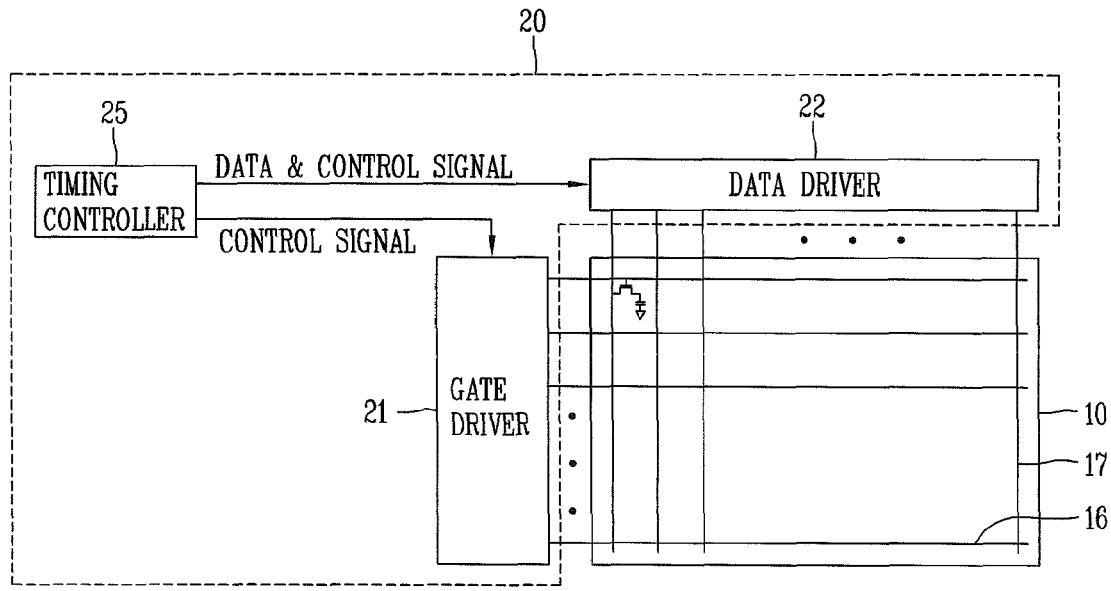
FIG. 1 is a schematic block diagram of a general liquid crystal display (LCD) device.
Figure 2:
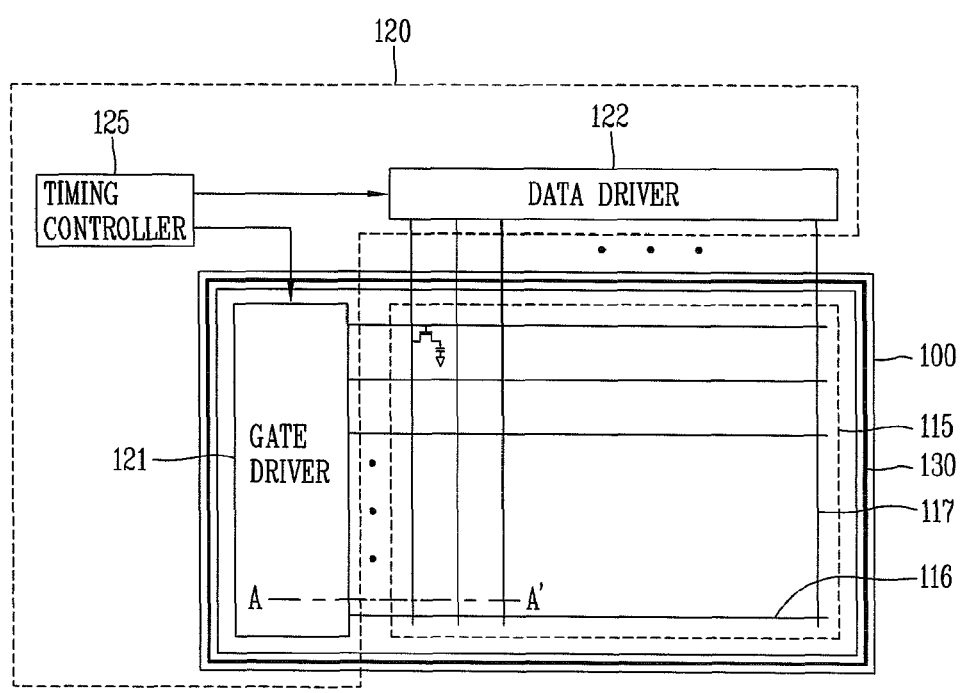
FIG. 2 is a schematic block diagram showing a GIP-type LCD device according to an embodiment of the present invention.

FIG. 2 is a schematic block diagram showing a GIP-type LCD device according to an embodiment of the present invention.

As shown in FIG. 2, the GIP-type LCD device according to an embodiment of the present invention includes a liquid crystal panel 100 and a driving circuit unit 120 supplying various signals required for implementing images.

The liquid crystal panel 100 includes a liquid crystal and first and second substrates attached in parallel with the liquid crystal interposed therebetween. Each internal surface of the substrates includes and an array element and a color filter element. On the inner surface of the first substrate called an array substrate, a plurality of horizontal gate lines 116 and a plurality of vertical data lines 117 cross to define pixels in a matrix form, and a thin film transistor (TFT) is provided at each crossing and connected to pixel electrodes formed at each pixel in a one-to-one manner.

On the inner surface of the second substrate called the color filter substrate, color filter elements such as color filter including red, green and blue sub-color filters that selectively transmit only light of a particular wavelength band and common electrodes facing the pixel electrodes with the liquid crystal layer interposed therebetween. The pixel electrodes, the common electrodes as well as the liquid crystal layer form a liquid crystal capacitor.

The driving circuit unit 120 includes a timing controller 125, a gate driver 121, a data driver 122, and other elements such as an interface for relaying an external driving system and the timing controller 125, a reference voltage generating unit for generating a reference voltage used at the data driver 122, and a power voltage generating unit for supplying operation power with respect to each element of the driving circuit unit 120 and a common voltage transferred to the common electrodes of the liquid crystal panel 100.

Image and control signals transferred from the external driving system are relayed to the timing controller 125 by an interface. The image signal includes luminance information with respect to an image to be displayed via pixels of the liquid crystal panel 100, and the control signal includes a vertical synchronous signal Vsync indicating a start and an end with respect to a frame screen, a horizontal synchronous signal Hsync indicating a start or an end with respect to a horizontal pixel row, a data enable DE indicating a valid data section of a horizontal pixel row, a data clock DCLK indicating a period of valid data, and the like.

The image and control signals are changed into a suitable form by the timing controller 125 and supplied to the gate driver 121 and the data driver 122, whereby the gate driver 121 generates a gate signal sequentially enabling horizontal pixel rows by the frames and scan-transfer it to the gate lines 161, and the data driver 122 generates a data signal for charging pixels opened by the gate signal and transfers it to each data line 117.

In the LCD device according to an embodiment of the present invention, when pixels selected by gate lines 161 according to the gate signal of the gate line 116 are open, data signals of the data line 117 are transferred to the corresponding pixels, whereby liquid crystal is driven by an electric field between the pixel electrodes and the common electrodes to implement a difference of transmittance.

To this end, the timing controller 125 generates a frame control signal including a gate shift clock GSC designating time at which TFTs are turned on, a gate output enable GOE controlling output of the gate driver 121, a gate start pulse GSP informing a start line of a screen image among one vertical signals, and the like, and transfers it to the gate driver 121, aligns data, and transfers a source sampling clock SSC latching data of a horizontal pixel row, an SOE, a data latch signal indicating a transfer time point of the data latched by the SSC, a source start pulse SSP indicating a start point of data among one horizontal signals, a POL alternately indicating a positive (+) polarity and a negative (−) polarity peak that determine the polarity of a data signal with a polarity inverting signal synchronized by the SOE, and the like, to the data driver 122.

In the LCD device according to an embodiment of the present invention, amorphous silicon is used as a semiconductor layer, a conductive channel of the TFT, and a portion or the entirety of the gate driver 121 is mounted within the first substrate of the liquid crystal panel 100 (GIP type). Thus, a shift resister unit of at least the gate driver 121 is mounted within the first substrate and completed during an array element fabrication process.

Namely, the gate driver 121 may be divided into the shift resister unit including a plurality of flip-flops outputting a certain signal according to a selective input state of setting and resetting and a level shifter amplifying an output signal level. In the general GIP method, at least the shift resister unit is mounted on the first substrate, and in this case, the shift resister unit has a form of a shift resister element group in which a plurality of shift resist unit elements connected in a one-to-one manner to the gate lines 116 are arranged in a row.

A portion or the entirety of the gate driver 121 mounted within the liquid crystal panel 100 can be completed during the fabrication process for the array element of the first substrate, having an effect that costs and processes can be reduced.

In the GIP type LCD device according to an embodiment of the present invention, a column spacer structure of a GIP circuit part is changed to the same diamond structure as a gap column spacer structure of an active region, and a dummy color filter pattern is formed at the GIP circuit part to form the same step as an active region where the cap spacer is positioned, to thereby prevent a cell gap deficiency between the GIP circuit part and the active region. This will be described in detail with reference to the accompanying drawings.

Figure 3:
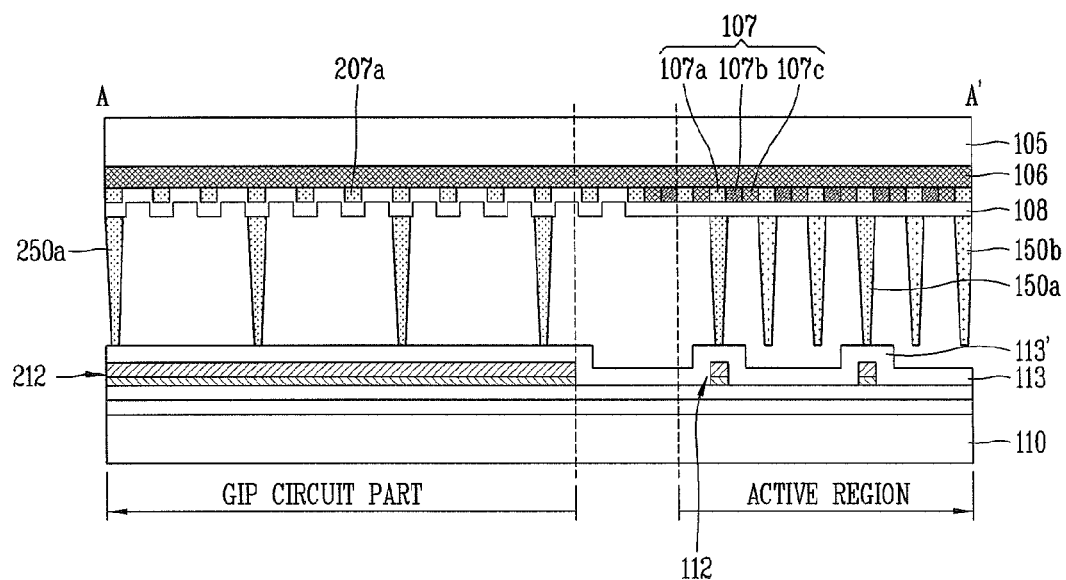
FIG. 3 is a sectional view taken along line A-A' in the GIP-type LCD of FIG. 2.

FIG. 3 is a sectional view taken along line A-A' in the GIP-type LCD device of FIG. 2, showing the GIP circuit part positioned at the left side of the liquid crystal panel and a start point of the active region.

Figure 4:
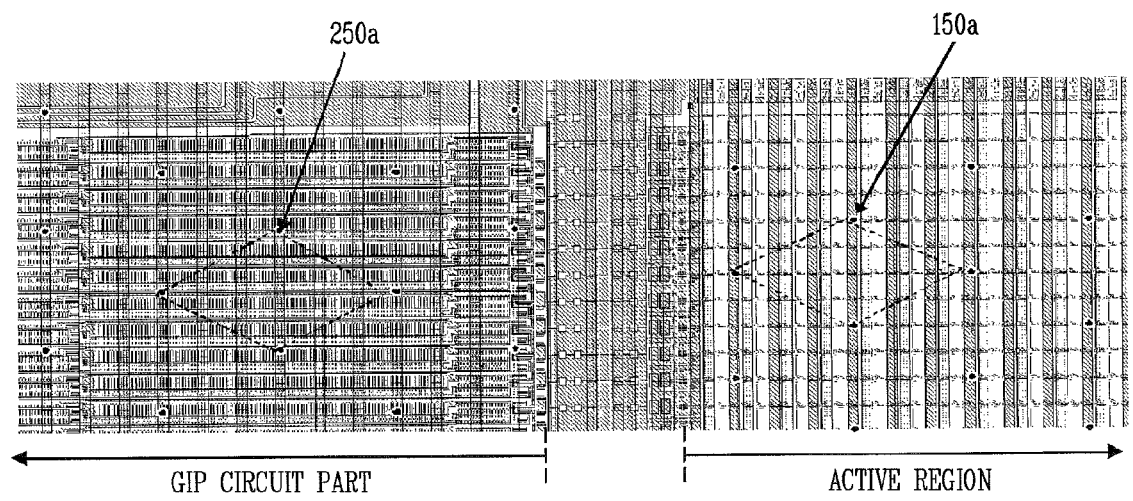
FIG. 4 is a photograph showing enlarged portions of a GPI circuit unit and an active region in the GIP-type LCD device according to an embodiment of the present invention.

FIG. 4 is a photograph showing enlarged portions of a GPI circuit unit and an active region in the GIP-type LCD device according to an embodiment of the present invention.

As shown, the liquid crystal panel according to an embodiment of the present invention may be divided into an active region on which an image is displayed and the GIP circuit part positioned at one edge of the active region and having the gate driver mounted thereon.

The liquid crystal panel includes a liquid crystal layer formed within the active region and the color filter substrate 105 and the array substrate 110 attached in parallel with the liquid crystal layer interposed therebetween. Inner surfaces of the substrates 105 and 110 include an array element and a color filter substrate. Although not shown, as the array element, horizontal gate lines and vertical data lines cross vertically and horizontally to define pixels in a matrix form on the inner surface of the array substrate 110 of the active region, and a TFT is provided at each crossing of the gate lines and the data lines and connected to the pixel electrode formed at each pixel in a one-to-one manner.

Reference numeral 111 denotes a gate insulating layer formed on the gate line 116, and 112 denotes a certain TFT pattern including TFTs. A passivation layer 113 at the active region where the TFT pattern 112 is positioned includes protrusions 113' formed with a certain distance toward the color filter substrate 105, having a certain step with respect to a region where the TFT pattern 112 is not positioned.

On the inner surface of the array substrate 110 of the GIP circuit part, there are formed, a certain GIP circuit pattern 212 such as the shift resister unit including a plurality of flip-flops outputting a certain signal according to a selective input state of setting and resetting as described above.

FIG. 3 shows the case of forming the TFT transistor pattern 112 using the active pattern constituting the TFT and the source and drain electrode pattern and the GIP circuit pattern 212, but the present invention is not limited thereto.

On the inner surface of the color filter substrate 105, color filter elements such as color filter 107 including red, green and blue sub-color filters 107a, 107b and 107c that selectively transmit only light of a particular wavelength band and common electrodes 108 facing the pixel electrodes with the liquid crystal layer interposed therebetween. The pixel electrodes, the common electrodes as well as the liquid crystal layer form a liquid crystal capacitor. On the inner surface of the color filter substrate 105 of the GIP circuit part, a dummy color filter pattern 207a corresponding to the red sub-color filter 107a of the active region is formed at the region where the column spacers 250a of the GIP circuit part are positioned.

Although not shown, a main seal pattern and a dummy seal pattern are positioned at the left side of GIP circuit part to attach the color filter substrate 105 and the array substrate 110.

In order to maintain a cell gap between the color filter substrate 105 and the array substrate 110, cap spacers 150a are formed by one per certain number of pixels at the active region, and one or more pressing spacers 150b are additionally formed between the cap spacers 150a in order to prevent a touch stain or pressing deficiency. In the embodiment of the present invention, the cap spacers 150a at the active region are disposed in a diamond structure.

Column spacers 250a are formed at the GIP circuit part. The column spacers 250a are disposed in the same diamond structure as the cap spacer 150a structure of the active region. The GIP circuit part column spacers 250a are positioned on the dummy color filter pattern 207a and has the same cell gap as the active region where the cap spacers 150a are positioned (See FIG. 4).

Here, the TFT pattern 112 and the GIP circuit pattern 212 are arbitrarily introduced for the sake of explanation, and the present invention is not limited thereto. In the present invention, the dummy color filter pattern 207a is formed on the color filter substrate 105 of the GIP circuit part where the column spacers 250a are positioned, and because there is no substantial step between the passivation layer 113 of the array substrate 110 on which the cap spacers 150a of the active region contact and the passivation layer 113 of the array substrate 110 on which the column spacers 250a of the GIP circuit part contact, the region where the cap spacers 150a of the active region are positioned and the region where the column spacers 250a of the GIP circuit part are positioned have the same cell gap.

In the liquid crystal panel according to an embodiment of the present invention, the gap between the color filter substrate 105 and the array substrate 110 is maintained due to the column spacers 250a of the GIP circuit part inserted within the GIP circuit part even after a liquid crystal dropping process. Also, the column spacer 250a structure of the GIP circuit part has the same diamond structure as the cap spacer 150a structure of the active region and the dummy color filter pattern 207a is formed at the GIP circuit part to have the same cell gap as the active region where the cap spacers 150a are positioned, thereby preventing a cell gap inflection between the GIP circuit part and the active region.

Namely, in employing the GIP method in which the gate driver is inserted within the TFT array substrate in the liquid crystal panel according to the embodiment of the present invention, in order to prevent a cell gap inflection generated between the GIP circuit part and the active region, the column spacers 250a of the GIP circuit part is designed to have the same density as the cap spacers 150a of the active region and the dummy color filter pattern 207a is inserted at the column spacer 250a position of the GIP circuit part to thus form the same cell gap with the active region.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A liquid crystal display (LCD) device comprising:
an array substrate divided into an active region on which an image displayed and a GIP circuit part on which a gate driver is mounted;
a color filter substrate attached to the array substrate in a facing manner;
a color filter formed on an inner surface of the color filter substrate of the active region and including a plurality of red, green and blue sub-color filters;
a plurality of dummy color filters formed on an inner surface of the color filter substrate of the GIP circuit part to correspond to the plurality of red sub-color filters to form the same step as the active region;
a passivation layer on the inner surface of the array substrate,
wherein the passivation layer at the active region where a TFT pattern is positioned includes protrusions formed with a certain distance toward the color filter substrate and
wherein the passivation layer at the GIP circuit part where a GIP circuit pattern is positioned has a certain step with respect to a region where the GIP circuit pattern is not positioned;
a seal pattern positioned at the outer side of the GIP circuit part;
a plurality of gap spacers formed between the sub-color filter of the color filter substrate and the protrusions of the passivation layer at the active region of the array substrate; and
a plurality of GIP column spacers formed between the dummy color filter of the color filter substrate and the passivation layer at the GIP circuit part where the GIP circuit pattern is positioned,
where the gap spacers have the same height as the GIP column spacers.

2. The device of claim 1, wherein the gap spacers are formed by one per certain number of pixels.

3. The device of claim 1, wherein at least one pressing spacer is additionally formed between the gap spacers to prevent a touch stain or a pressing deficiency.

4. The device of claim 1, wherein the gap spacers of the active region and the GIP column spacers are disposed in a diamond structure.

5. The device of claim 1, wherein the GIP circuit part where the GIP column spacers are positioned has the same cell gap as the active region where the gap spacers are positioned.

6. The device of claim 1, wherein the gap spacers of the active region and the GIP column spacers are disposed with the same density.

* * * * *